US012692743B2

(12) United States Patent
Safford

(10) Patent No.: US 12,692,743 B2
(45) Date of Patent: Jul. 28, 2026

(54) SYSTEM AND METHOD FOR A GLASS PANEL SUPPORT STRUCTURE UTILIZING ONLY VERTICAL FRAMING

(71) Applicant: Innovation Glass, LLC, Tivoli, NY (US)

(72) Inventor: Franz Safford, Tivoli, NY (US)

(73) Assignee: Innovation Glass LLC, Tivoli, NY (US)

( * ) Notice: Subject to any disclaimer, the term of this patent is extended or adjusted under 35 U.S.C. 154(b) by 77 days.

(21) Appl. No.: 18/928,500

(22) Filed: Oct. 28, 2024

(65) Prior Publication Data

US 2026/0117578 A1 Apr. 30, 2026

(51) Int. Cl.
*E06B 3/58* (2006.01)

(52) U.S. Cl.
CPC .................................... *E06B 3/58* (2013.01)

(58) Field of Classification Search
CPC .... E04B 2/7433; E04B 2/7435; E04B 2/7437; E04B 2/7438; E04B 2002/7446; E04B 2/90; E06B 3/5427; E06B 3/58; E06B 3/64
See application file for complete search history.

(56) References Cited

U.S. PATENT DOCUMENTS

| | | | |
|---|---|---|---|
| 2,345,650 | A | 4/1944 | Attwood |
| 2,901,785 | A | 9/1959 | Hinchliffe et al. |
| 2,996,845 | A | 8/1961 | Cipriani et al. |
| 3,052,330 | A | 9/1962 | Hammit et al. |
| 3,053,353 | A | 9/1962 | Miller |
| 3,176,806 | A | 4/1965 | Ferrell |
| 3,266,209 | A | 8/1966 | Zibell |
| 3,266,210 | A | 8/1966 | Grossman |
| 3,321,880 | A | 5/1967 | Ferrell et al. |
| 3,478,480 | A | 11/1969 | Swensen |
| 3,548,558 | A | 12/1970 | Grossman |
| 3,561,182 | A | 2/1971 | Madl, Jr. |
| 3,813,120 | A | 5/1974 | Kelly |

(Continued)

FOREIGN PATENT DOCUMENTS

| | | |
|---|---|---|
| CN | 216865635 | 7/2022 |
| DE | 10111246 | 9/2002 |

(Continued)

OTHER PUBLICATIONS

Stabalux Brochure, Apr. 1, 2008.
QuadroClad Facades, 2008.
Halfen Channel, Halfen GmBH, Jun. 2022.

*Primary Examiner* — Rodney Mintz
(74) *Attorney, Agent, or Firm* — Noblitt & Newson, PLLC

(57) ABSTRACT

A system and method for the assembly and support of glass panels when used in conjunction with a curtain wall system. The system may generally include a pair of spaced apart mullions, a pair of upper anchors, a pair of lower anchors, and a pair of gravity fittings. The pair of upper anchors may be coupled to the upper end of the pair of mullions and the building structure. The pair of lower anchors may be coupled to the lower end of the pair of mullions and the building structure. The pair of gravity fittings may be coupled to an exterior face at the lower end of the pair of mullions. The gravity fitting may comprise a bracket coupled to the pair of mullions and a shelf configured to support a portion of the glass panel.

17 Claims, 13 Drawing Sheets

(56) References Cited

U.S. PATENT DOCUMENTS 3,900,996 A 8/1975 Yohe
3,938,297 A 2/1976 Sato et al.
4,031,680 A 6/1977 Stoakes
4,073,113 A 2/1978 Oudot et al.
4,469,198 A 9/1984 Crump
4,500,572 A 2/1985 Francis
4,560,130 A 12/1985 Schwartz
4,568,050 A 2/1986 Radoy et al.
4,680,905 A 7/1987 Rockar
4,784,552 A 11/1988 Rebentisch
4,873,805 A 10/1989 Ting
4,873,806 A 10/1989 Jeschke
4,895,331 A 1/1990 Nehls
4,948,313 A 8/1990 Zankovich
5,154,385 A 10/1992 Lindberg et al.
5,209,619 A 5/1993 Rinderer
5,245,808 A 9/1993 Grunewald et al.
5,323,577 A 6/1994 Whitmyer
5,481,839 A 1/1996 Lang et al.
5,833,417 A 11/1998 Sargent et al.
5,839,236 A 11/1998 Frey
RE36,681 E 5/2000 Rinderer
6,086,300 A 7/2000 Frohlich
6,105,794 A 8/2000 Bauer
6,401,410 B2 6/2002 Kenny et al.
6,484,465 B2 11/2002 Higgins
6,588,711 B2 7/2003 Onishi
6,598,361 B2 7/2003 Ting
6,712,540 B2 3/2004 Schmalzhofer et al.
6,827,320 B2 12/2004 Yeh
6,993,873 B2 2/2006 Biebuyck et al.
7,004,667 B2 2/2006 Ludwig et al.
7,043,884 B2 * 5/2006 Moreno .............. E04F 13/0808
52/489.1
7,234,566 B2 6/2007 Simmons
7,444,781 B2 * 11/2008 Luo ....................... E06B 3/5427
52/204.593
7,478,504 B2 1/2009 Huebner et al.
7,644,549 B2 * 1/2010 Speck ....................... E04B 2/90
52/235
7,681,366 B2 * 3/2010 De Gobbi ............. E04F 13/083
52/235
7,716,891 B2 5/2010 Radford
7,779,584 B2 * 8/2010 Arias ...................... E04B 2/965
52/204.597
7,818,931 B2 * 10/2010 Grunewald ............... E04B 2/96
52/844
8,973,316 B2 * 3/2015 Safford ..................... E04B 2/96
52/235
9,567,746 B1 2/2017 Barbulescu et al.
9,909,309 B1 3/2018 Conklin
10,202,763 B2 * 2/2019 Hogan .................... E04B 2/965
10,934,706 B2 * 3/2021 Stein ......................... E04D 3/08
11,952,770 B2 * 4/2024 Taylor ..................... E04B 1/388
11,982,122 B2 * 5/2024 Condon .................... E04B 2/96
12,565,773 B2 * 3/2026 Worden .................... E04B 2/90
12,571,208 B2 * 3/2026 Safford ................. E04B 2/7435
12,601,172 B2 * 4/2026 Safford ................. E04B 2/7435
2001/0004099 A1 * 6/2001 Onishi .................. F16B 37/045
248/65
2001/0011444 A1 * 8/2001 Kenny .................. E06B 3/5427
52/235
2002/0124514 A1 9/2002 Higgins
2003/0033764 A1 * 2/2003 Ting .......................... E04C 3/32
52/235
2003/0036314 A1 * 2/2003 Schmalzhofer ......... F16B 7/187
439/680
2003/0150179 A1 8/2003 Moreno
2004/0025459 A1 2/2004 Huebner et al.
2004/0033103 A1 * 2/2004 Ludwig ................... F16B 7/187
403/188
2004/0074174 A1 * 4/2004 Biebuyck .................. E04B 2/96
52/235
2004/0155161 A1 * 8/2004 Yeh ...................... A47B 57/565
248/220.22
2004/0221526 A1 11/2004 Rinehart et al.
2005/0034400 A1 * 2/2005 Luo ....................... E06B 3/5427
52/506.01
2005/0098392 A1 * 5/2005 Simmons ................ B66B 7/027
187/414
2005/0284053 A1 12/2005 Grunewald et al.
2006/0016133 A1 1/2006 Speck
2006/0123722 A1 6/2006 Stenvall et al.
2006/0201084 A1 9/2006 Arias
2007/0094955 A1 5/2007 Safford
2007/0194191 A1 8/2007 Persson
2008/0222981 A1 9/2008 De Gobbi
2009/0145071 A1 * 6/2009 Radford ................ E04F 19/061
52/506.08
2015/0135615 A1 * 5/2015 Hogan ...................... E04B 2/90
52/745.1
2016/0222653 A1 8/2016 Niehaus et al.
2017/0350117 A1 * 12/2017 Hogan ...................... E04B 1/36
2018/0283003 A1 * 10/2018 Stein ....................... E04B 2/967
2023/0038884 A1 2/2023 Condon et al.
2023/0220667 A1 * 7/2023 Worden .................... E04B 2/90
52/235
2023/0243148 A1 8/2023 Taylor et al.
2025/0263924 A1 * 8/2025 Safford ................. E04B 2/7435
2025/0263925 A1 * 8/2025 Safford ................. E04B 2/7435
2025/0277365 A1 * 9/2025 Safford ..................... E04B 2/90
2025/0297508 A1 * 9/2025 Safford ................. B21C 23/142

FOREIGN PATENT DOCUMENTS

EP 0136431 A2 4/1985
FR 2585391 A1 1/1987
GB 2397310 A 7/2004
KR 20110100608 A 9/2011
KR 20160092978 A 8/2016
WO 95/13439 A1 5/1995
WO 00/45020 A1 8/2000
WO 2002101166 A1 12/2002
WO 2004083545 A1 9/2004
WO 2010063297 A1 6/2010

* cited by examiner

SYSTEM AND METHOD FOR A GLASS PANEL SUPPORT STRUCTURE UTILIZING ONLY VERTICAL FRAMING

BACKGROUND OF THE TECHNOLOGY

A variety of systems are used in the construction of buildings. Many of these systems employ a framework, such as in the case of conventional point-supported and conventional glass wall systems. In these systems, panes of glass are attached to, and supported by horizontal mullions and vertical mullions. The attachment of glass panels to horizontal and vertical mullions provides challenges due to the aesthetic & performance issues with the finished façade appearance.

SUMMARY OF THE TECHNOLOGY

A system and method for the assembly and support of glass panels when used in conjunction with a curtain wall system. The system may generally include a pair of spaced apart mullions, a pair of upper anchors, a pair of lower anchors, and a pair of gravity fittings. The pair of upper anchors may be coupled to the upper end of the pair of mullions and the building structure. The pair of lower anchors may be coupled to the lower end of the pair of mullions and the building structure. The pair of gravity fittings may be coupled to an exterior face at the lower end of the pair of mullions. The gravity fitting may comprise a bracket coupled to the pair of mullions and a shelf configured to support a portion of the glass panel.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures. For simplicity and clarity of illustration, elements in the figures are not necessarily drawn to scale.

DETAILED DESCRIPTION OF THE DRAWINGS

Figure 1:
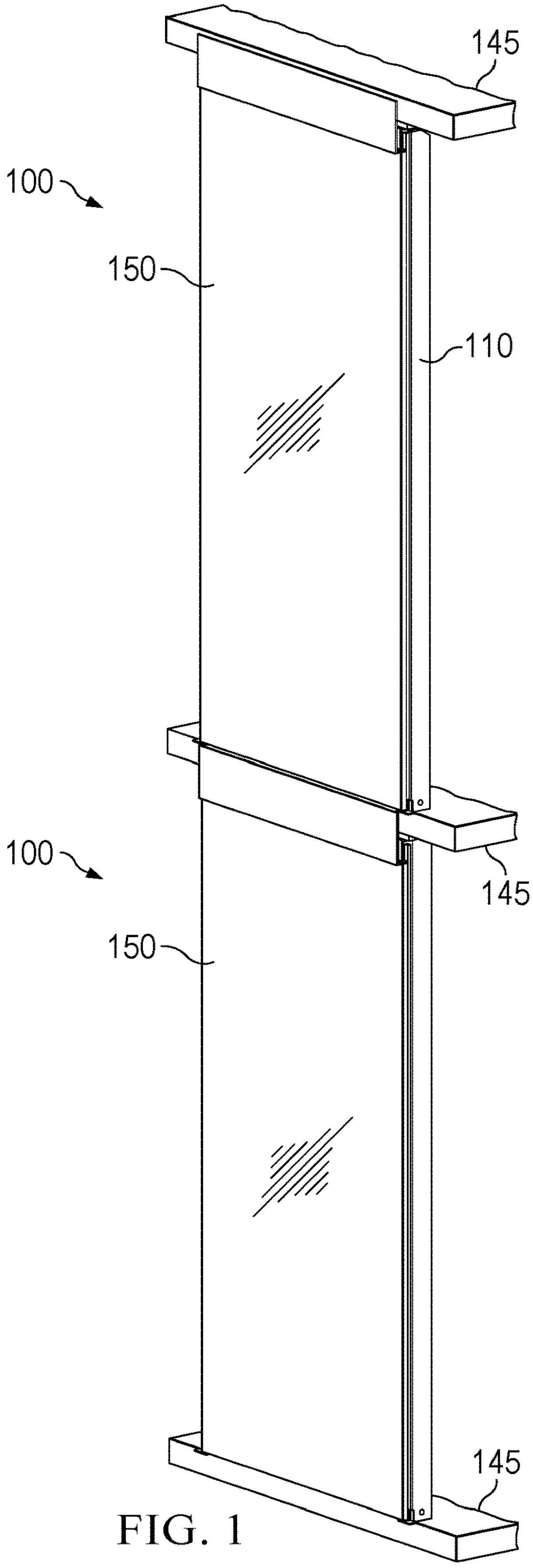
FIG. 1 representatively illustrates a perspective view of a pair of construction assembly systems for a glass panel in a vertical array and attached to a building structure in accordance with an exemplary embodiment of the present technology.

The present technology may be described in terms of functional block components and various processing steps. Such functional blocks may be realized by any number of components configured to perform the specified functions and achieve the various results. For example, the present technology may employ various types of curtain wall systems, walls, anchors, bars, plates, glass panels, glass panes, glass fins, sealing materials, fittings, hangers, fasteners, spacers, walls, and the like, which may carry out a variety of functions. Further, the present technology may employ any number of components for a construction system utilized to support glass panels or panes.

A curtain wall system, also known as a panelized window wall system, is a type of architectural feature commonly used in modern building design. Typically, a curtain wall system is a non-structural exterior building envelope designed to keep out the weather and create a barrier between the interior and exterior of a building. A curtain wall system employs certain structural attributes that resist applied loads (wind) and to support itself but generally does not contribute to the structural integrity of the building itself. It is typically composed of lightweight materials such as aluminum, glass, and steel, and may be attached to the building's structure but does not carry the load of the building itself. The term "curtain wall" is derived from the idea that the system hangs like a curtain from the building's structure. The curtain wall system may be used to support glass panels, which allow natural light to enter the building and provide occupants with views of the surroundings. The glass panels used in curtain walls are often double-glazed for insulation and energy efficiency.

A curtain wall system may provide structural support when mounting glass panels. A curtain wall system may also distribute the loads and resist wind pressure and other environmental forces. The curtain wall system may utilize various seals and gaskets, which are integrated into the curtain wall system to prevent water, air, and other environmental elements from entering the building. These elements maintain the building's integrity and ensure a comfortable interior environment.

The curtain wall system may also use mullions to support the glass panels and are utilized to transfer wind loads and other forces to the building structure. Various other attachment mechanisms, such as anchors, fittings and the like are used to attach the glass panels to the mullions and the mullions to the building structure.

Curtain wall systems are desired in the construction and architectural industry for their sleek and minimalist appearance. They create a transparent or semi-transparent barrier that allows natural light to penetrate interior spaces of buildings and provide a sense of openness and connection with the surrounding environment. Curtain wall systems may also provide thermal insulation and reduce heat transfer enhance to the energy efficiency of the building. Additionally, curtain wall systems may be designed to offer acoustic insulation, helping to reduce noise transmission from the exterior to the interior or vice versa. Depending on the choice of materials and glazing used, curtain wall systems may also contribute to sustainable building practices by maximizing natural daylight, reducing the need for artificial lighting, and improving energy efficiency.

Curtain wall systems offer a high degree of customization in terms of size, shape, and glass type. This allows architects and designers to create unique and visually striking building facades. As such, curtain wall systems are commonly used in commercial buildings, office spaces, retail centers, and even residential architecture. They are often featured in contemporary and modern architectural designs where transparency, aesthetics, and functionality are important considerations.

Various representative implementations of the present technology may be applied to any system for construction. Certain representative implementations may include systems and methods tailored to a specific type of construction, such as point-supported glass wall systems with curtain wall systems.

Figure 2:
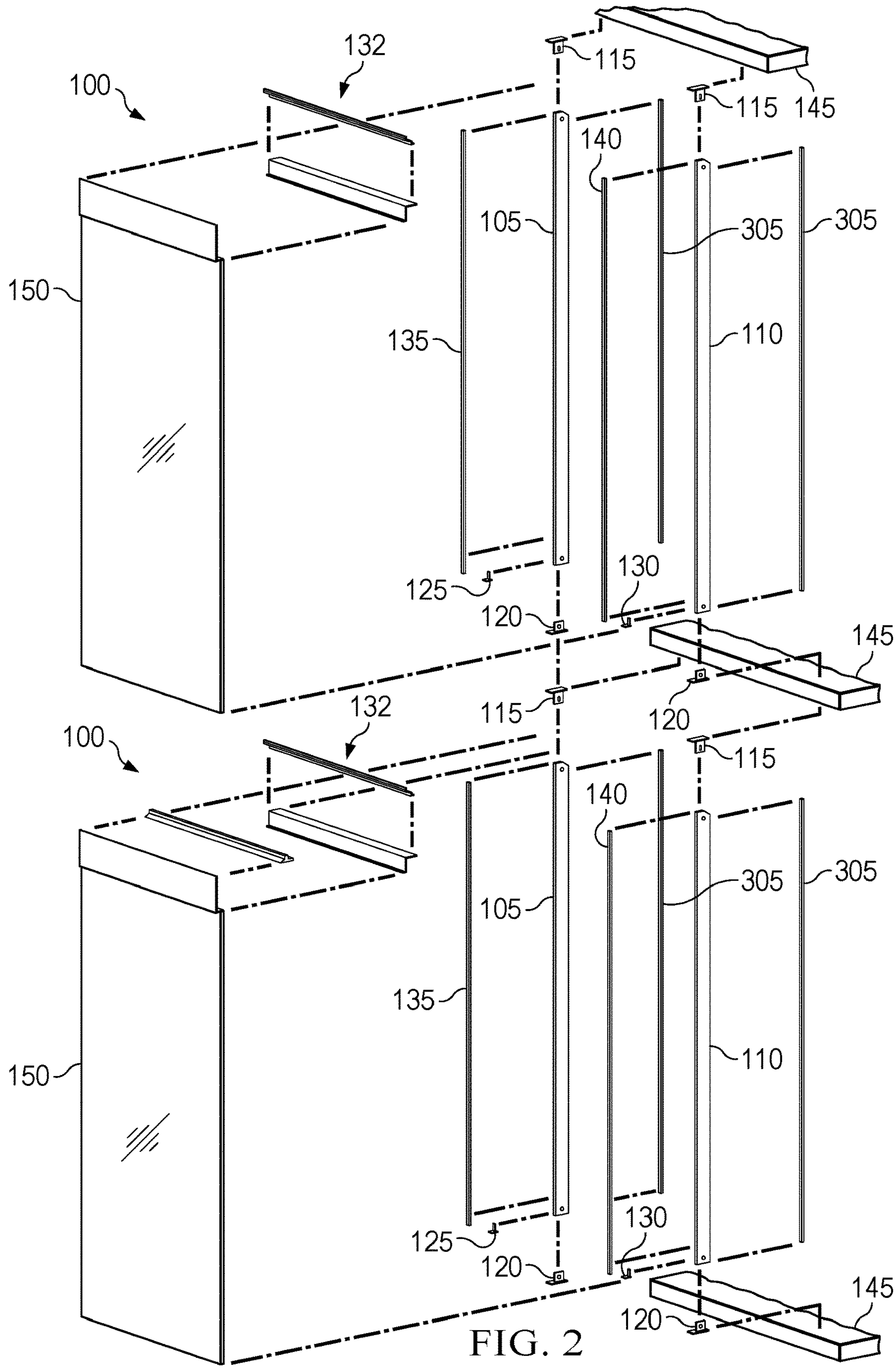
FIG. 2 representatively illustrates an exploded, perspective view of a construction assembly system for a glass panel in a vertical array and attached to a building structure in accordance with an exemplary embodiment of the present technology.

Referring now to FIGS. 1-2, a curtain wall system 100 generally comprises a pair of mullions 105, 110, a pair of upper anchors 115 and lower anchors 120 configured to be couple to each of the pair of mullions 105, 110, a pair of gravity fittings 125, 130, and a pair of elastomeric connectors 135, 140. The curtain wall system 100 and the components thereof are adapted to be coupled to a building structure 145 and support at least a portion of a glass panel 150. The pair of upper and lower anchors 115, 120 are configured to couple the mullions 105, 110 to the existing building structure 145. The building structure may comprise a slab, floor, beam, wall and/or the like.

The pair of mullions 105, 110 are spaced apart at generally a distance of the width of glass panel 150. The gravity fittings 125, 130 may be coupled to the pair of mullions 105, 110 and are configured to support the glass panel 150.

The curtain wall system 100 may comprise multiple curtain wall systems 100 that may be placed in a vertical and/or horizontal array when attaching glass panels to a building structure. FIG. 1 shows a pair of curtain wall systems 100 arranged in a vertical array where a first curtain wall system is located above a second curtain wall system. The lower curtain wall system 100 may comprise a connection element 132 that mounts to the upper portion of the pair of mullions 105, 110 and facilitates the attachment of upper and lower systems when installed in a vertical array. (See FIG. 4). FIGS. 10A and 11A show multiple curtain wall systems 100 arranged in a horizontal array in concave and convex arrangements. It should be noted that the horizonal arrays may also comprise multiple curtain wall systems 100 that are generally aligned with one another. The curtain wall systems 100 may be arranged in both horizontal and vertical arrays to complete the outer appearance of a building or other suitable structure.

Figure 3:
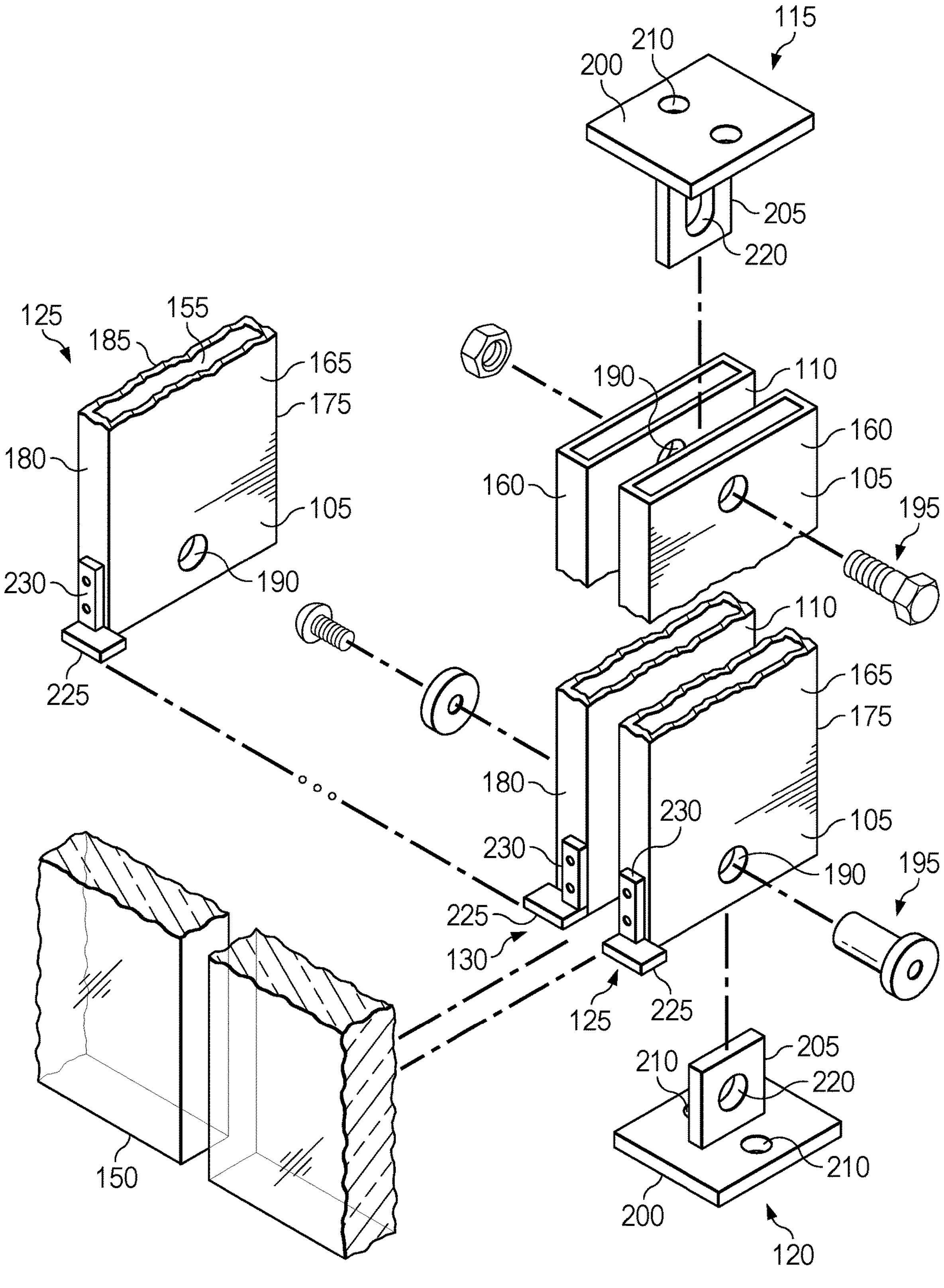
FIG. 3 representatively illustrates an exploded side view of a gravity fitting attached to a mullion, supporting a glass panel, and configured to attach to a building structure in accordance with an exemplary embodiment of the present technology.

Referring now to FIG. 3, the pair of mullions 105, 110 may be fabricated using any method of manufacture known in the art and may include any number of suitable materials, such as aluminum, steel, graphite, composite, and/or the like. In one embodiment, the pair mullions 105, 110 may be fabricated from forged or extruded aluminum.

The structure of the pair of mullions 105, 110 allows them to support the weight of the construction sections or glass panels 150 held by the pair of gravity fittings 125, 130 without the need for a horizontal support. Additionally, the pair of mullions 105, 110 may permit translational or rotational motion in response to environmental effects, such as wind, rain and/or thermal expansion or contraction.

The pair of mullions 105, 110 generally comprises a structure having a mullion body with one or more void cavities 155. The cavity 155 may be of any volume or shape and may be disposed within any part of the mullion. For example, the mullion may comprise a plurality of cavities with intervening structures between the void cavities, for example, in order to increase the load bearing strength of the mullion. Alternatively, the pair of mullions 105, 110 may comprise a single cavity or may be solid.

The pair of mullions 105, 110 may connect with any suitable structures, systems, and devices in any suitable manner to achieve any particular purpose. The pair of mullions 105, 110 may be configured for attachment to the building structure 145 such as a slab, floor, wall and/or the like. The pair of mullions 105, 110 may be attached to any suitable surface in any suitable manner, and may be configured to support any structure, system, device, or architectural element in any suitable manner. For example, the structure of the pair of mullions 105, 110, the pair of upper and lower anchors 115, 120, and the gravity fittings 125, 130 may provide attachment to the building structure 145 and may provide support for the construction section and/or glass panels.

The pair of mullions 105, 110 may each comprise an upper end 160, a lower end 165, an interior end 175 and an exterior face 180. The mullion body/cavity 155 is located between the interior end 175 and the exterior face 180 of the mullion. The mullion body may comprise a pair of sidewalls 185, is typically hollow, and runs vertically from the upper end 160 to the lower end 165. The sidewalls 185 each contain an aperture 190 located adjacent to the upper and lower ends 160, 165. The apertures 190 receive fasteners 195 and are configured to couple pair of mullions 105, 110 to the pair of upper and lower anchors 115, 120, which are coupled to the building structure 145.

The interior end 175 may be positioned towards the interior of a structure being constructed while the exterior face 180 is configured to attach to the gravity fittings 125, 130 that support the glass panel 150.

Referring now to FIG. 3, the upper and lower anchors 115, 120 may comprise a base 200 and a mullion mount 205. The upper anchor 115 may comprise a downwardly depending mullion mount 205 and the lower anchor 120 may comprise an upwardly depending mullion mount 205. The mullion mount 205 is oriented generally perpendicular to the base 200. The base 200 may comprise at least one aperture 210 to couple the upper and lower anchors 115, 120 to the building structure 145 by fasteners 215 (shown in FIGS. 4 and 5A). A gasket 212 comprising a slot 214 may be coupled between the base 200 and mullion 110 as part of the air seal of the installed wall assembly. The mullion mount 205 may comprise an aperture 220 configured to couple an adjacent pair of mullions 105, 110 when a curtain wall system 100 is placed in a horizontal array. The aperture 220 may be a standard circle configuration or an elongated aperture to achieve enhanced tolerances and adjustability for installation. The adjacent pair of mullions 105, 110 may be coupled to the mullion mount 205 via fastener 195.

Referring to FIG. 3, the gravity fittings 125, 130 may provide support for the construction section and/or glass panels 150. The gravity fittings 125, 130 may comprise a shelf 225 and a bracket 230. The bracket 230 may depend upwardly from the shelf 225 and is oriented generally perpendicular thereto. The bracket may comprise at least one aperture to couple the gravity fittings 125, 130 to the exterior face 180 of the mullions 105, 110 via a fastener 235 (shown in FIGS. 4, 5A and 6). The shelf 225 supports at least a portion of the glass panel 150. The shelf 225 on the gravity fittings 125, 130 may be flush with the outer sidewall 185 of the mullions 105, 110 and may extend inwardly past the inner sidewall of the mullions 105, 110 to create a support surface.

Figure 4:
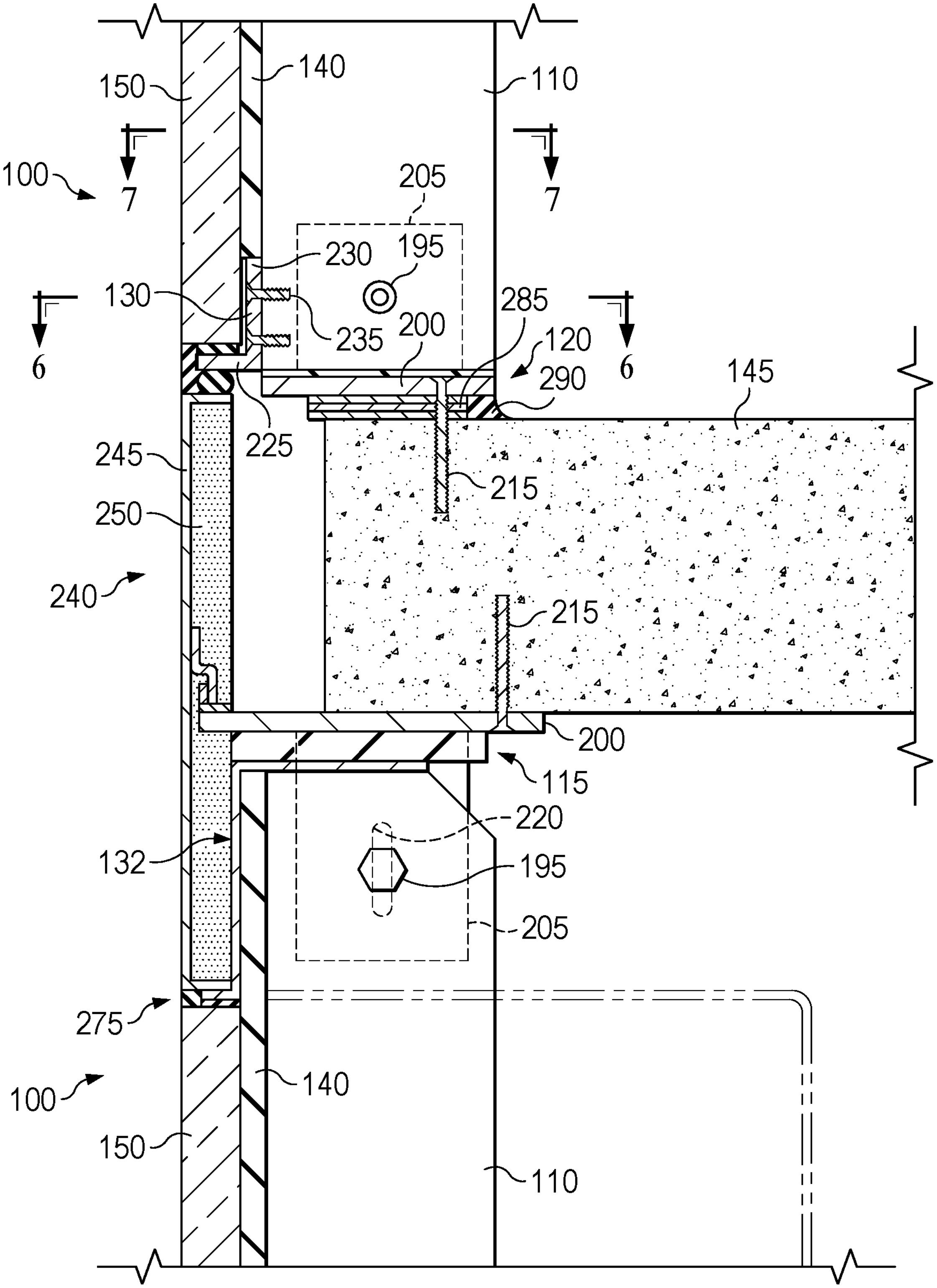
FIG. 4 representatively illustrates a side, cross-sectional view of a construction assembly system for a glass panel attached to a building structure with a metal panel located between the glass panels in accordance with an exemplary embodiment of the present technology.
Figure 5A:
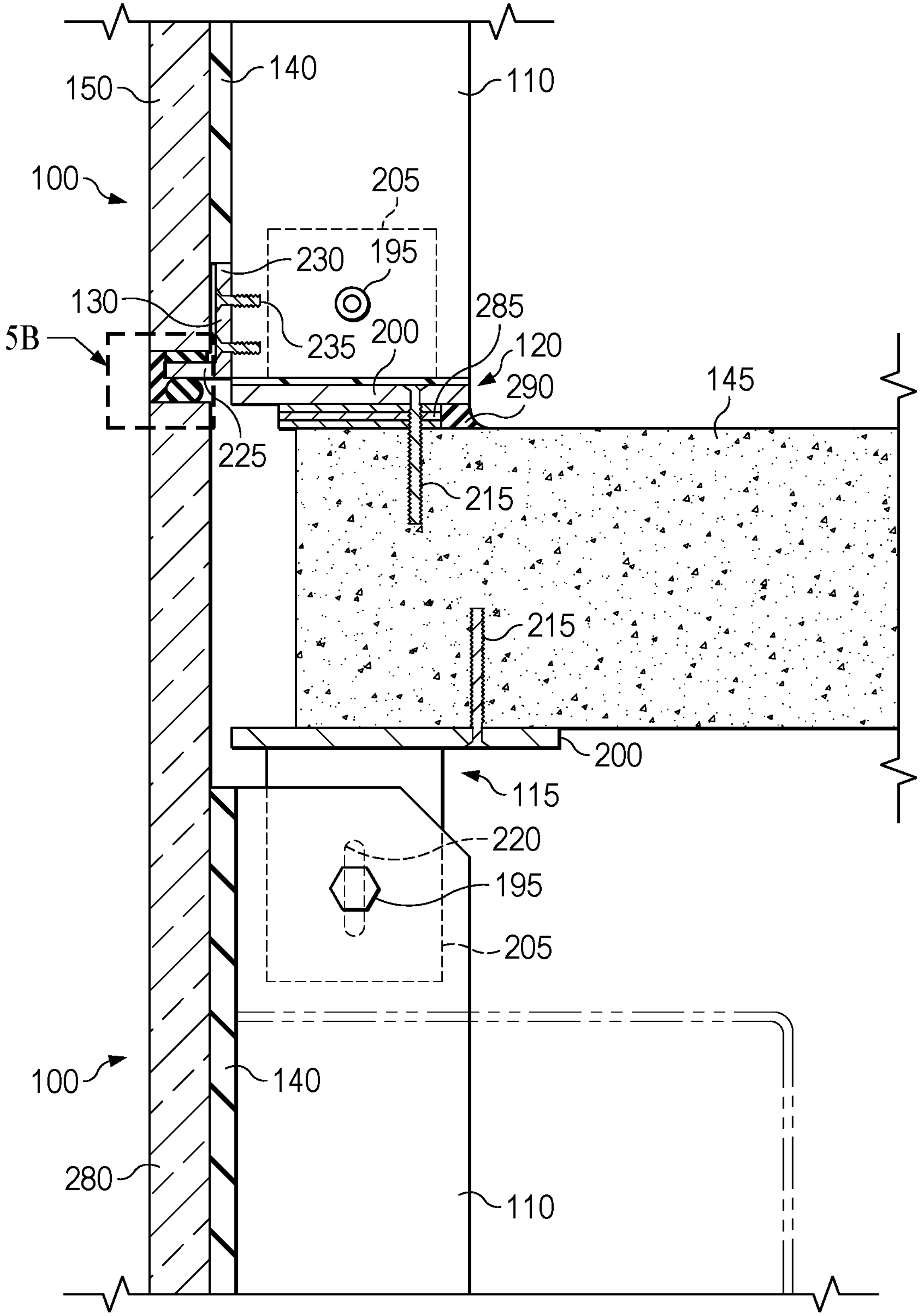
FIG. 5A representatively illustrates a side, cross-sectional view of a construction assembly system for a glass panel attached to a building structure with an elongated glass panel in place of the metal panel in accordance with an exemplary embodiment of the present technology.

Referring now to FIGS. 2, 4, and 5A, the elastomeric connectors 135, 140 may comprise a structural silicone material that couples the glass panel 150 to the exterior face 180 of the mullions 105, 110. As shown in FIGS. 4 and 5A, the elastomeric connectors 135, 140 are sandwiched between the inner surface of the glass panel and the exterior face 180 of the mullions 105, 110. The elastomeric connectors 135, 140 function to structurally connect the panel 150 to the exterior face 180 of the mullions 105, 110. The curtain wall system 100 may also be sealed from the elements by elastomeric connector 270 (FIG. 5B) and 325 (FIGS. 6 & 7) such that no external debris may enter and to provide enhanced thermal performance.

Figure 5B:
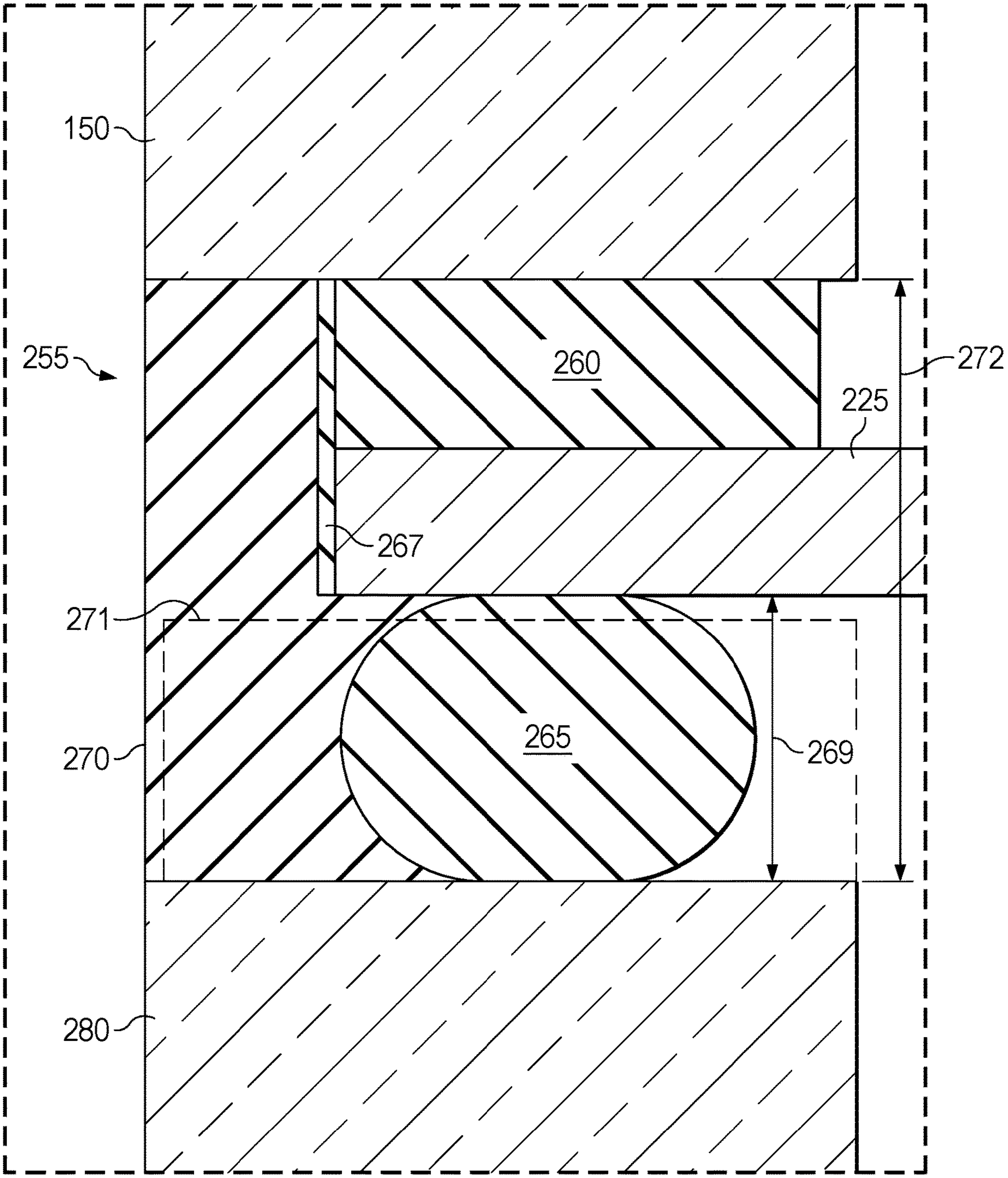
FIG. 5B representatively illustrates a detailed view taken from FIG. 5A of an expansion joint connecting and supporting the glass panels in accordance with an exemplary embodiment of the present technology.

Referring now to FIG. 4, a metal panel 240 is shown that is configured to connect the curtain wall systems 100 when the curtain wall systems 100 are oriented in a vertical array. The metal panel 240 may comprise an outer panel 245 and an inner insulated portion 250 that is coupled to a lower portion of an upper curtain wall system 100 and an upper portion of a lower curtain wall system 100. The material for the inner insulated portion 250 may comprise foam insulation. The metal panel 240 is coupled to the lower portion of an upper curtain wall system 100 by an expansion joint 255, which is shown in FIG. 5B. The expansion joint 255 may comprise a setting block 260, an elastomeric support 265, a bond breaker 267 and a silicone seal 270. The glass panel 150 from the upper curtain wall system 100 is supported by the setting block 260. The setting block 260 is located between the upper surface of the shelf 225 of the gravity fittings 125, 130 and the bottom of panel 150. The elastomeric support 265 is located between the lower surface of the shelf 225 of the gravity fittings 125, 130 and the top of panel 280. The bond breaker 267 in FIG. 5B may be attached to the front of shelf 225 and elastomeric support 260 and allows for expansion of the curtain wall systems 100 to occur when installed by allowing the compression of the seal 270 over the full distance 272 between the bottom of the upper panel 150 and the top of the bottom panel 280. If the bond breaker 267 were not there, the silicone seal 270 would adhere to the front of the gravity fitting 225 and support 260 thereby reducing the portion of the silicone seal 270 that could compress under movement to the width of the expansion gap 269 below the shelf 225. The dashed line 271 shows how much the expansion gap 269 may close due to downward movement of the upper panel 150, which rests on the shelf 225.

Typical sealants are only allowed to compress 50% of the starting dimension. For example: say the overall joint width between the upper and lower panels 150=1 in and the expansion gap below the shelf 225 is ½ in. With the bond breaker 267 it is possible to consider the full width of the expansion joint 255 (1 in) when calculating the allowable compression which=½ in. Since the gap under the shelf 225 is ½ in the expansion joint 255 can accommodate the full ½ in of movement (see dashed lines on FIG. 5B.) Conversely, without the bond breaker 267, the "free" portion of the expansion joint 255 that is not sticking/adhering to the front of the shelf 225 and the elastomeric support 260 is only the dimension of the gap 290 below the 225 shelf or ½ in. Considering the 50% compression rule with a starting joint dimension of ½ in the allowable compression is only ¼ in. By using the bond breaker 267 the movement capacity of this expansion joint 255 is increased by a factor of 2. Typical building deflections are in the ⅜ in to ½ in range so this is a critical detail. The silicone seal 270 is applied to seal the curtain wall systems 100 from any environmental factors.

Referring again to FIG. 4, the metal panel 240 is coupled to the upper portion of a lower curtain wall system 100 by a silicone seal 275. The silicone seal 275 is located between the lower surface of the metal panel 240 and the upper surface of the glass panel 150 on the lower curtain wall system 100.

Referring now to FIG. 5A, a curtain wall system 100 is oriented in a vertical array showing a pair of curtain wall systems 100, with the lower curtain wall system 100 having an elongated glass panel 280. The remainder of the lower curtain wall system 100 is similar to the system described above. In this embodiment, as shown in FIG. 5B, the elongated glass panel 280 extends upward to engage the elastomeric support 265 and the silicone seal 270. The lower anchor 120 also resides on a shim stack 285, which allows for the correction of the tolerance of height during installation of the curtain wall system 100. A silicone seal 290 may also be applied to protect the curtain wall system 100 from external environmental elements.

Figure 6:
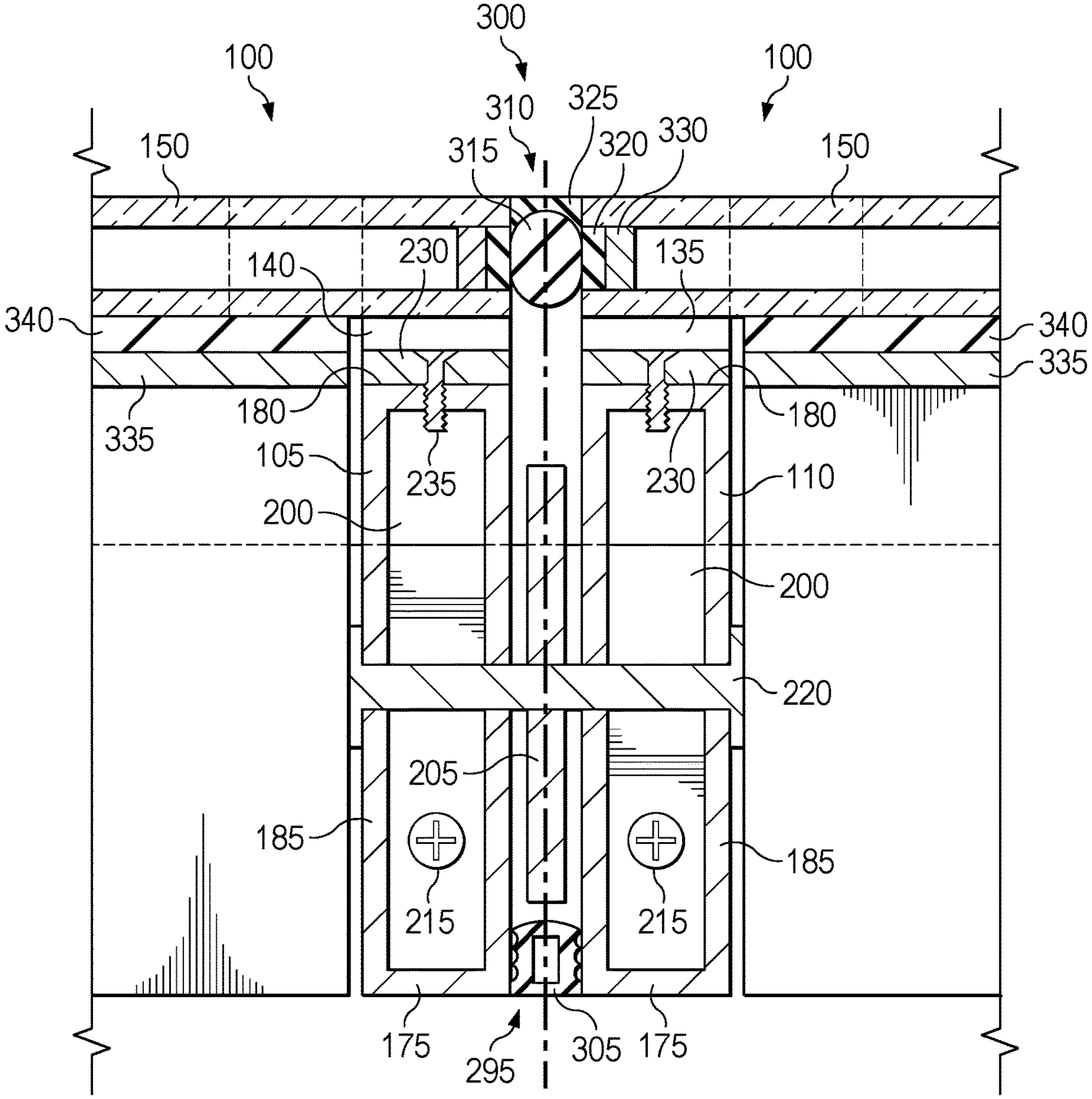
FIG. 6 representatively illustrates a cross-sectional plan view taken along the line 6-6 in FIG. 4 in accordance with an exemplary embodiment of the present technology.
Figure 7:
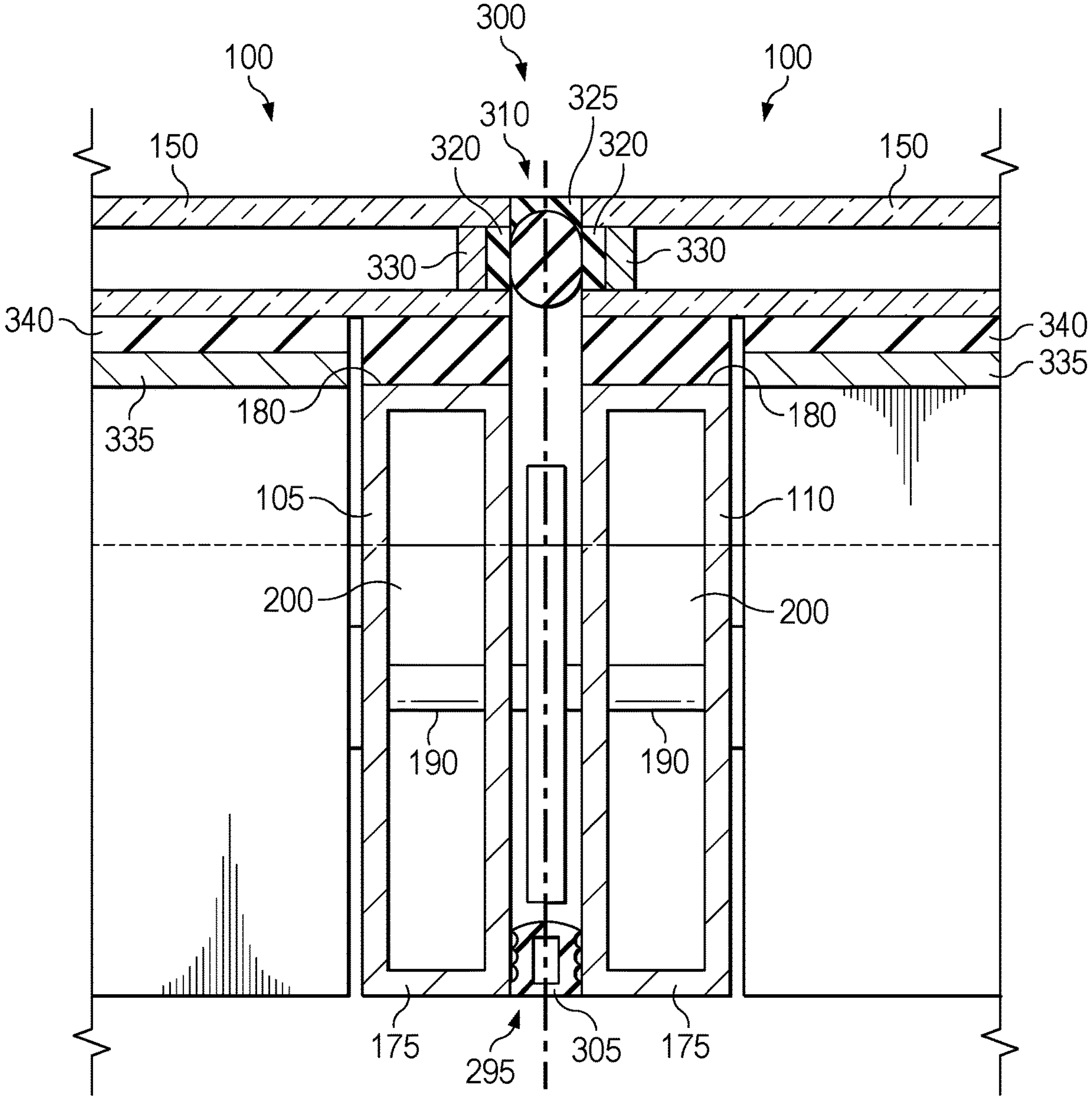
FIG. 7 representatively illustrates a cross-sectional plan view taken along the line 7-7 in FIG. 4 in accordance with an exemplary embodiment of the present technology.
Figure 8:
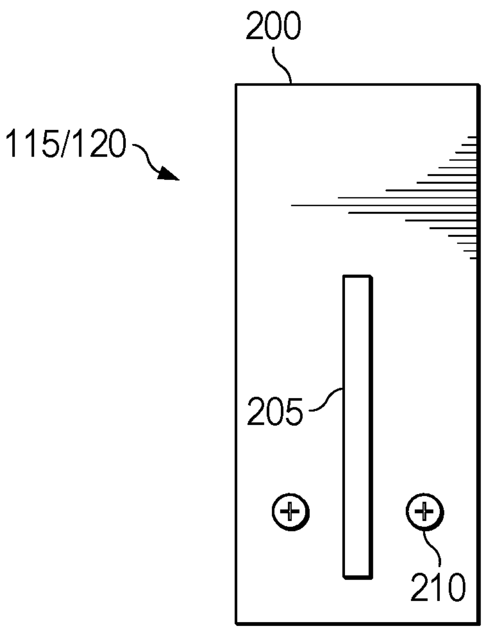
FIG. 8 representatively illustrates a plan view of an upper and lower anchor in accordance with an exemplary embodiment of the present technology.
Figure 9:
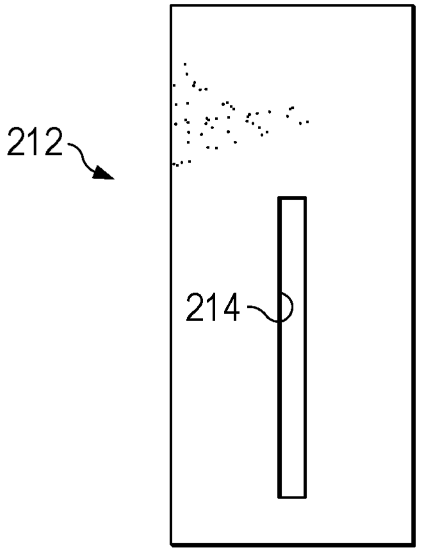
FIG. 9 representatively illustrates a plan view of a gasket in accordance with an exemplary embodiment of the present technology.

When the curtain wall systems 100 are aligned in a horizontal array, the adjacent systems are sealed together to protect the system from external elements. As shown in FIGS. 6 and 7, the curtain wall systems 100 arranged in a horizontal array may be sealed on an interior end 295 and an exterior end 300. The interior end 295 is sealed by an elongated vertical oriented gasket 305, which may comprise any suitable sealant material, including but not limited to silicone, silicon elastomer and the like. The gasket 305 is positioned between the walls of the pair of mullions 105, 110 adjacent to the interior end 175 and provides an air seal to the installed wall systems 100.

The exterior end 300, which is the outwardly facing portion of the curtain wall system 100 is coupled by a vertical seal 310. The vertical seal 310 may comprise a foam backer rod 315, a pair of silicone edge seals 320, and a silicone weather seal 325. The backer rod 315 may comprise an elongated vertical oriented foam sealant aid to limit the depth of the seal 325. The backer rod 315 may comprise any suitable sealant material, including but not limited to closed cell foam, open cell foam and the like. The backer rod 315 runs vertically and is located between the edge seals 320, which abut the glass spacers 330 in the glass panels 150. The edge seals 320 may comprise silicone edge seals. The silicone seal 325 is a weather seal applied to the backer rod between the vertical edges of the glass panels 150.

FIGS. 6 and 7 also illustrate other sealing components in the curtain wall system 100. A sill closure 335 is shown with a structural silicone 340 applied between the sill closure 335 and the inner wall of the glass panel 150.

Figure 10:
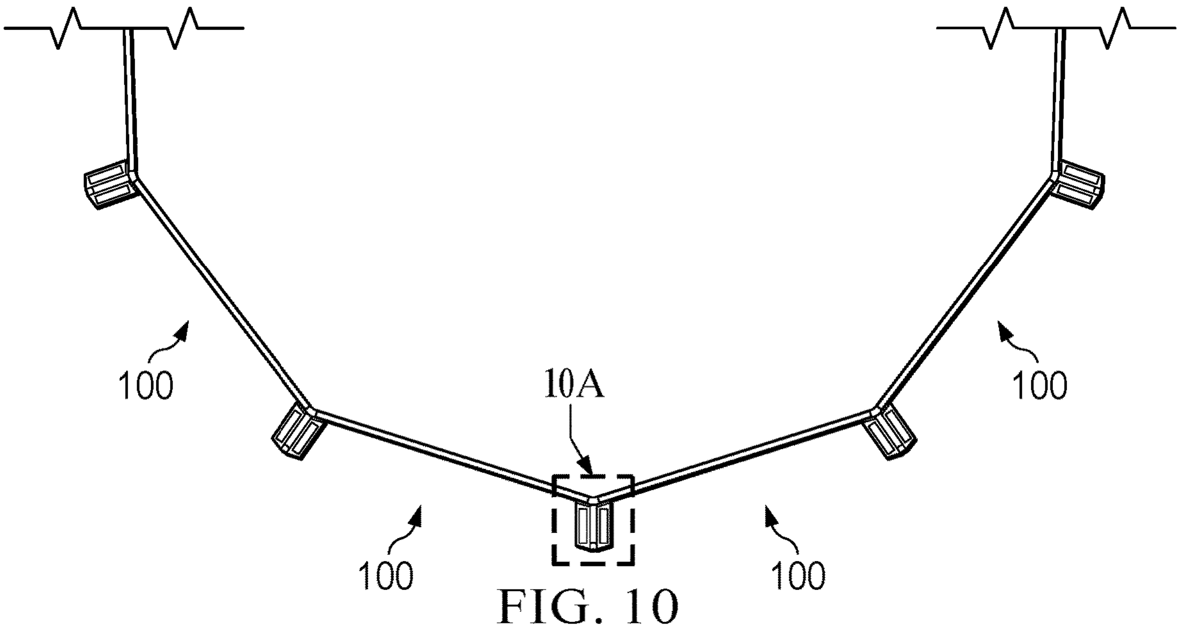
FIG. 10 representatively illustrates a top, plan view of a plurality of construction assembly systems with glass panels in a concave arrangement in a horizontal array in accordance with an exemplary embodiment of the present technology.
Figure 11:
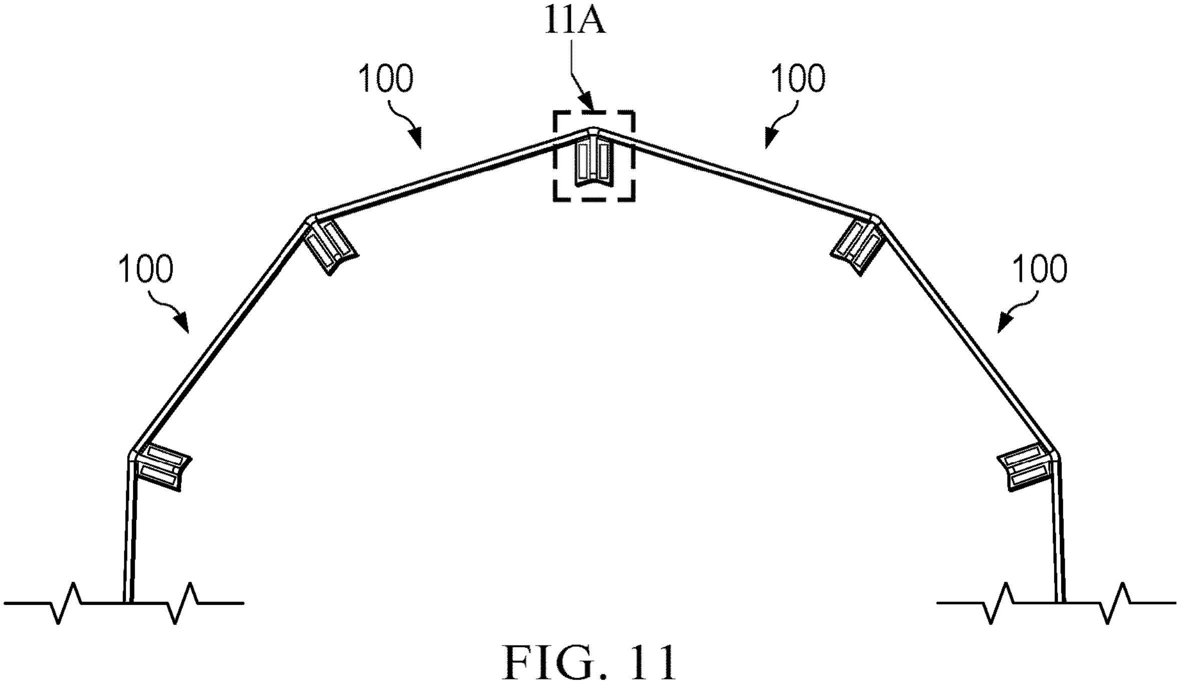
FIG. 11 representatively illustrates a top, plan view of a plurality of construction assembly systems with glass panels in a convex arrangement in a horizontal array in accordance with an exemplary embodiment of the present technology.
Figure 10A:
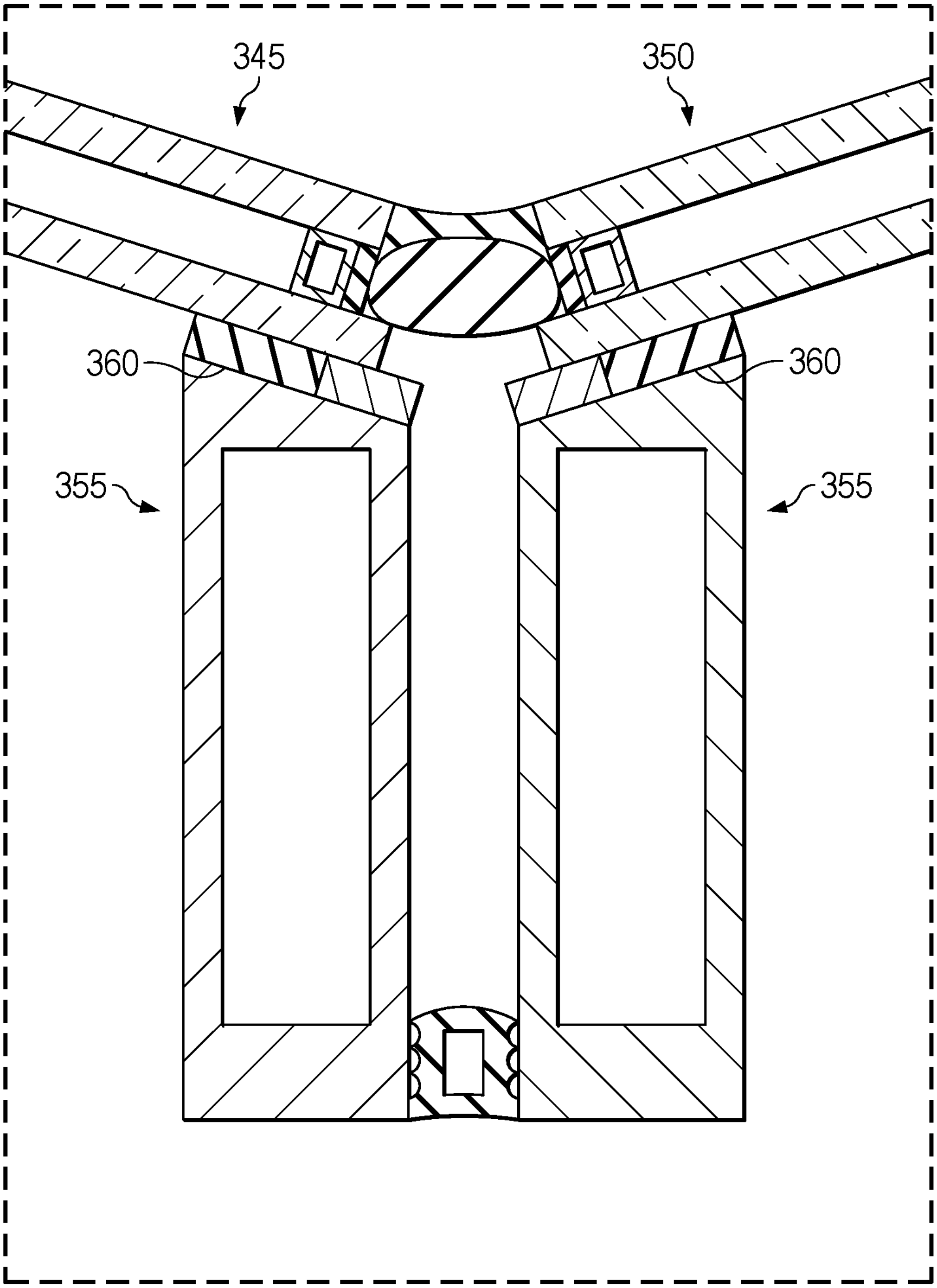
FIG. 10A representatively illustrates a detail view taken from FIG. 10 of adjoining construction assembly systems with glass panels in accordance with an exemplary embodiment of the present technology.
Figure 11A:
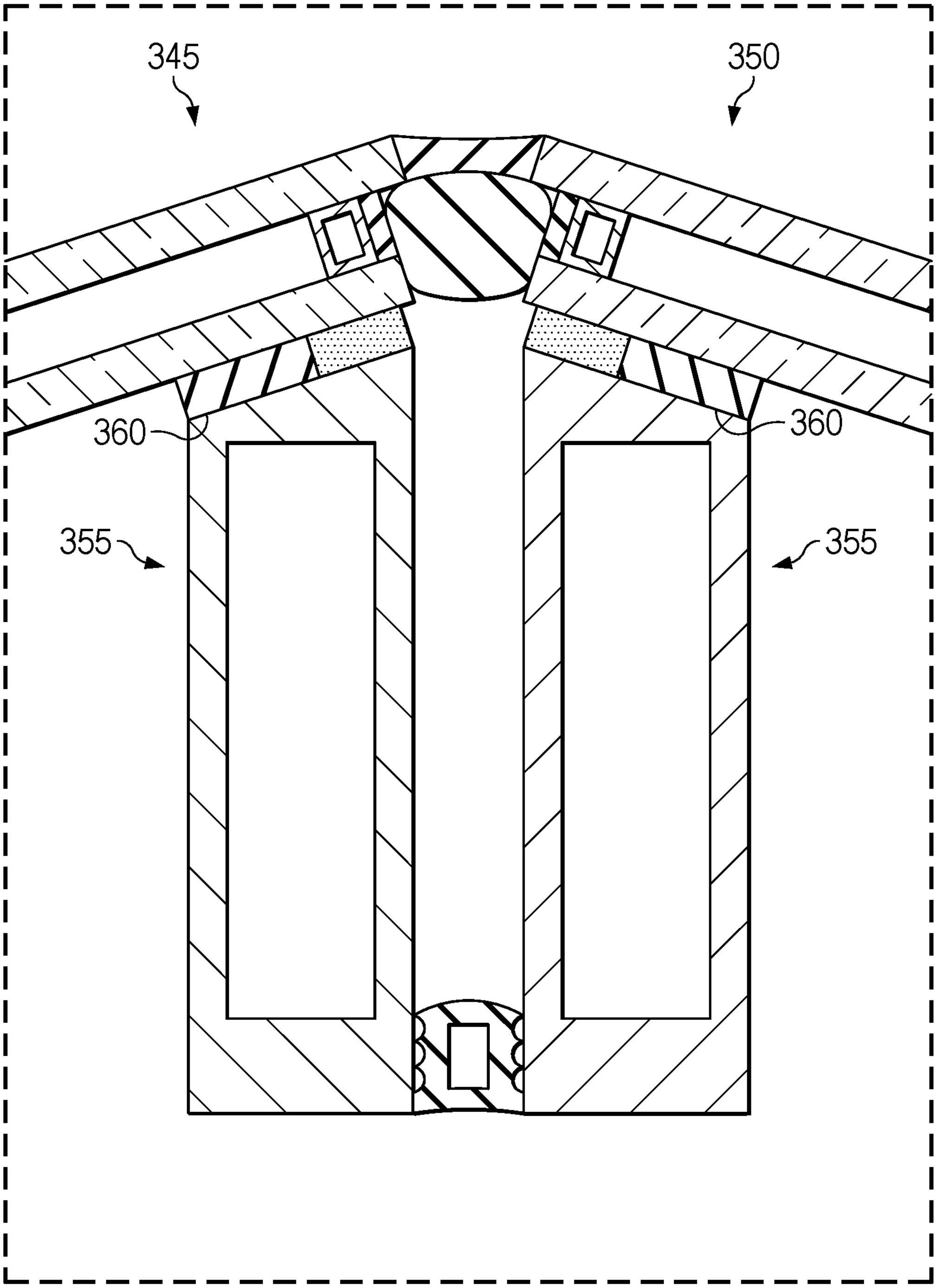
FIG. 11A representatively illustrates a detail view taken from FIG. 11 of adjoining construction assembly systems with glass panels in accordance with an exemplary embodiment of the present technology.
Figure 12:
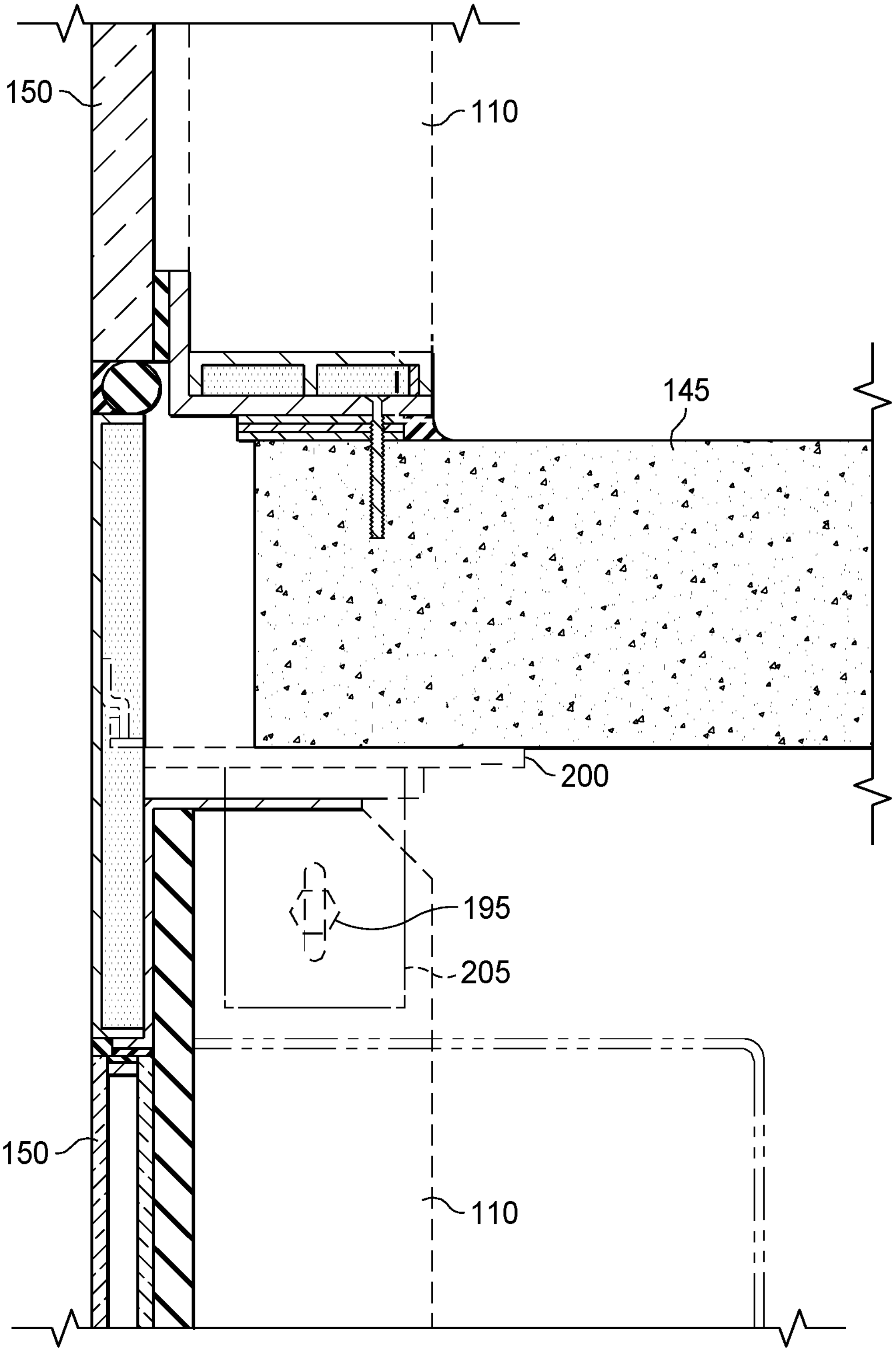
FIG. 12 representatively illustrates a side, cross-sectional view of a construction assembly system for a glass panel attached to a building structure with a metal panel in accordance with an exemplary embodiment of the present technology.

Referring now to FIGS. 10 and 11, a plurality of curtain wall panels 100 are shown in concave and convex orientations. As shown in FIGS. 10A and 11B, the adjacent curtain wall panels 345 and 350 may comprise mullions 355 that have angled exterior faces 360. The angled exterior faces 360 may comprise any suitable angle to conform with the design requirement of the building that utilizes the curtain wall panels 345 and 350 to orient the glass panels 150 in any suitable configuration. The edges of the glass panels 345 and 355 are offset or stepped as shown in FIG. 10A and FIG. 11B to allow the exterior glass joint width to be controlled to be equal to the horizontal glass joint width.

In a construction system according to various aspects of the present technology, mullions may be attached to the structure of a building to provide a framework for supporting construction sections. The construction system may also be used to achieve various aesthetic benefits. Additionally, construction systems in accordance with the present technology may be used to achieve any structural benefit, whether now known or hereafter described in the art, such as the ability to construct a multi-story glass wall system using substantially vertically aligned mullions without the need for horizontally aligned mullions.

Constructs (i.e., construction designs) that may be realized via implementation of various embodiments of the present technology shall be understood to comprise anything that may be at least partially assembled from at least one or more component parts, such as, for example: a window; a wall; a partition; a frame; a panel; a covering; a dome; a door; a display case; a display wall; a display frame; a cubicle; a presentation display; a booth; an enclosure; a temporary habitat; a mobile home; a video device array; various architectural construction elements; and/or the like.

A 'construction section' shall be understood to comprise any component part of a construct surface, such as, for example, a pane of glass, a panel of wood, a sheet of drywall, a graphite board, Plexiglas, Lucite, a video device element, etc. Furthermore, a construction section may comprise any two-dimensional (e.g., substantially planar) or three-dimensional (e.g., polyhedral, spherical, hemispherical, elliptical, parabolic, etc.) geometry and/or any combination thereof.

In the foregoing description, the technology has been described with reference to specific exemplary embodiments. Various modifications and changes may be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

As used herein, the terms "comprises," "comprising," or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same. Any terms of degree such as "substantially," "about," and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. A curtain wall system for supporting a glass panel having a height, width, and sides and configured to be coupled to a building structure, the curtain wall system comprising:

a pair of spaced apart vertical mullions;

a pair of upper anchors coupled to an upper end of the pair of mullions and to the building structure;

a pair of lower anchors coupled to a lower end of the pair of mullions and to the building structure;

a pair of gravity fittings coupled to an exterior face of the vertical mullions at the lower end thereof and configured to support a portion of the glass panel; and a pair of elastomeric connectors coupled between the exterior face of the vertical mullions and an interior surface of the glass panel.

2. The curtain wall system of claim 1, wherein the pair of elastomeric connectors are coupled adjacent said sides of the glass panel.

3. The curtain wall system of claim 1, wherein the pair of upper anchors each comprise a base coupled to the building structure and a mount extending downwardly from the base and coupled to the pair of mullions.

4. The curtain wall system of claim 1, wherein the pair of lower anchors each comprise a base coupled to the building structure and a mount extending upwardly from the base and coupled to the pair of mullions.

5. The curtain wall system of claim 1, wherein the pair of mullions are spaced apart at a distance substantially equivalent to the width of the glass panel.

6. The construction system of claim 1, wherein the pair of upper and lower anchors are coupled to the mullions by a fastener.

7. The curtain wall system of claim 1, wherein the gravity fittings comprise a bracket coupled to the exterior face at the lower end of the pair of mullions and a shelf configured to support the portion of the glass panel.

8. The curtain wall system of claim 7, wherein the shelf is horizontal and the bracket is oriented vertically perpendicular thereto.

9. A curtain wall system configured to be coupled to a building structure, the curtain wall system comprising:
- a glass panel comprising a height, a width, and a pair sides;
- a pair of vertical mullions spaced apart at a distance substantially equivalent to the width of the glass panel;
- a pair of upper anchors coupled to an upper end of the pair of mullions and to the building structure;
- a pair of lower anchors coupled to a lower end of the pair of mullions and to the building structure;
- a pair of gravity fittings coupled to an exterior face of the vertical mullions at the lower end thereof and configured to support a portion of the glass panel; and
- a pair of elastomeric connectors coupled between the exterior face of the vertical mullions and an interior surface of the glass panel.

10. The curtain wall system of claim 9, wherein the pair of elastomeric connectors are coupled adjacent said sides of the glass panel.

11. The curtain wall system of claim 9, wherein the pair of gravity fittings each comprise a bracket coupled to the exterior face at the lower end of the pair of mullions and a shelf configured to support the portion of the glass panel.

12. The curtain wall system of claim 9, wherein the pair of upper anchors each comprise a base coupled to the building structure and a mount extending downwardly from the base and coupled to the pair of mullions.

13. The curtain wall system of claim 9, wherein the pair of lower anchors each comprise a base coupled to the building structure and a mount extending upwardly from the base and coupled to the pair of mullions.

14. A construction method for providing a curtain wall system for support for a glass panel, comprising:
- providing a pair of spaced apart vertical mullions;
- providing a pair of upper anchors coupled to an upper end of the pair of mullions and to the building structure;
- providing a pair of lower anchors coupled to a lower end of the pair of mullions and to the building structure;
- providing a pair of gravity fittings coupled to an exterior face of the vertical mullions at the lower end thereof and configured to support a portion of the glass panel; and
- providing a pair of elastomeric connectors coupled between an exterior face of the vertical mullions and an interior surface of the glass panel.

15. The construction method of claim 14, wherein the pair of elastomeric connectors are coupled adjacent said sides of the glass panel.

16. The construction method of claim 14, wherein the gravity fittings comprise a bracket coupled to the exterior face at the lower end of the pair of mullions and a shelf configured to support the portion of the glass panel.

17. The construction method of claim 14, wherein the upper and lower anchors comprise a base coupled to the building structure and a mount extending from the base and coupled to the pair of mullions.

* * * * *